United States Patent
Anthony et al.

(10) Patent No.: US 11,655,047 B2
(45) Date of Patent: May 23, 2023

(54) SYSTEM AND METHOD FOR MONITORING AN ELECTRONIC CHECKLIST AND SUPPORTING SENSORS

(71) Applicant: HONEYWELL INTERNATIONAL INC., Charlotte, NC (US)

(72) Inventors: Samantha Anthony, Peoria, AZ (US); Kevin Wayne Williams, Glendale, AZ (US); Chandrasekhar Aleti, Hyderabad (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 182 days.

(21) Appl. No.: 17/118,116

(22) Filed: Dec. 10, 2020

(65) Prior Publication Data

US 2022/0119126 A1    Apr. 21, 2022

(30) Foreign Application Priority Data

Oct. 21, 2020  (IN) .............................. 202011045857

(51) Int. Cl.
| | |
|---|---|
| *G06F 3/048* | (2013.01) |
| *B64D 45/00* | (2006.01) |
| *G08G 5/00* | (2006.01) |
| *B64D 43/00* | (2006.01) |

(52) U.S. Cl.
CPC ............. *B64D 45/00* (2013.01); *B64D 43/00* (2013.01); *G08G 5/0021* (2013.01); *B64D 2045/0085* (2013.01)

(58) Field of Classification Search
CPC ................... B64D 45/00; B64D 43/00; B64D 2045/0085; B64D 2045/0075; G08G 5/0021; G08G 5/0052
See application file for complete search history.

(56) References Cited

U.S. PATENT DOCUMENTS

| | | | |
|---|---|---|---|
| 7,289,890 B2 | 10/2007 | Mitchell et al. | |
| 9,171,273 B2 | 10/2015 | Thomas | |
| 10,642,270 B2 | 5/2020 | Duda et al. | |
| 2014/0207314 A1* | 7/2014 | Kou | ...................... B64D 43/00 701/14 |
| 2017/0345318 A1* | 11/2017 | Kim | ...................... B64D 45/00 |
| 2018/0082596 A1* | 3/2018 | Whitlow | .............. G05D 1/0088 |

(Continued)

FOREIGN PATENT DOCUMENTS

| | | |
|---|---|---|
| EP | 1410124 B1 | 7/2006 |
| EP | 0752142 B2 | 8/2008 |

(Continued)

*Primary Examiner* — Aleksey Olshannikov
(74) *Attorney, Agent, or Firm* — Lorenz & Kopf, LLP (57) ABSTRACT

Methods and systems are provided for operating an electronic checklist for an aircraft. The system includes an aviation sub-system that is part of an aircraft, where the aviation subsystem is an item on the electronic checklist. Also included is a sensor that monitors the status of the aviation sub-system with reference to the electronic checklist. An onboard computer system monitors the electronic checklist and determines the status of the aviation sub-system as required by the electronic checklist along with the operational condition of the sensor that monitors the status of aviation sub-system. Finally, a graphical display shows the status of the aviation sub-system and the operational condition of the sensor.

20 Claims, 4 Drawing Sheets

(56) References Cited

U.S. PATENT DOCUMENTS

2020/0118366 A1    4/2020   Ryan et al.
2021/0292008 A1*   9/2021   Shaflik .................. B64D 45/00

FOREIGN PATENT DOCUMENTS

| EP | 3196814 A1 | 7/2017 |
| EP | 3312796 A1 | 4/2018 |
| WO | 0235303 A2 | 5/2002 |

* cited by examiner

SYSTEM AND METHOD FOR MONITORING AN ELECTRONIC CHECKLIST AND SUPPORTING SENSORS

CROSS REFERENCE TO RELATED APPLICATION

This application claims priority to Indian Provisional Patent Application No. 202011045857, filed Oct. 21, 2021, the entire content of which is incorporated by reference herein.

TECHNICAL FIELD

The present invention generally relates to aircraft operations, and more particularly relates to monitoring an electronic checklist and supporting sensors.

BACKGROUND

The use of checklists by an aircrew crew of the aircraft is an important part of preflight planning and flight operations. Originally, paper checklists were used. However, these checklists eventually were transferred to an electronic format. Various degrees of automation are typically used to monitor electronic checklists. Hence, there is a need for a system and method for monitoring an electronic checklist and supporting sensors.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for operating an electronic checklist for an aircraft. The system comprises: an aviation sub-system that is part of an aircraft, where the status of the aviation subsystem is indicated by an item on the electronic checklist; a sensor that monitors the status of the aviation sub-system with reference to the item on the electronic checklist; an onboard computer system that monitors the completion of the item on the electronic checklist, where the computer system determines, the status of the aviation sub-system as required by the item on the electronic checklist, and the operational condition of the sensor that monitors the status of aviation sub-system; and a graphical display unit that shows completion of each item on the electronic checklist, where the graphical display unit shows the status of the aviation sub-system and the operational condition of the sensor if the status of the item on the electronic checklist is incomplete.

A method is provided for operating an electronic checklist for an aircraft. The method comprises: receiving an electronic checklist that indicates the status of an aviation subsystem as an item on the electronic checklist; monitoring a sensor that monitors the status of the aviation sub-system with reference to the item on the electronic checklist; determining with an onboard computer system that monitors the completion of the item on the electronic checklist, the status of the aviation sub-system as required by the item on the electronic checklist, and the operational condition of the sensor that monitors the status of aviation sub-system; and showing the status of the completion of each item on the electronic checklist with a graphical display unit, where the graphical display unit shows the status of the aviation sub-system and the operational condition of the sensor if the status of the item on the electronic checklist is incomplete.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods have been developed for operating an electronic checklist for an aircraft. The system includes an aviation sub-system that is part of an aircraft, where the aviation subsystem is an item on the electronic checklist. Also included is a sensor that monitors the status of the aviation sub-system with reference to the electronic checklist. An onboard computer system monitors the electronic checklist and determines the status of the aviation sub-system as required by the electronic checklist along with the operational condition of the sensor that monitors the status of aviation sub-system. Finally, a graphical display shows the status of the aviation sub-system and the operational condition of the sensor.

Before proceeding further, it is noted that, for convenience, the following description is in the context of an aircraft environment. It will be appreciated, however, that the claimed invention is not limited to any particular aircraft environment but may be implemented in numerous other vehicular and non-vehicular environments.

Figure 1A:
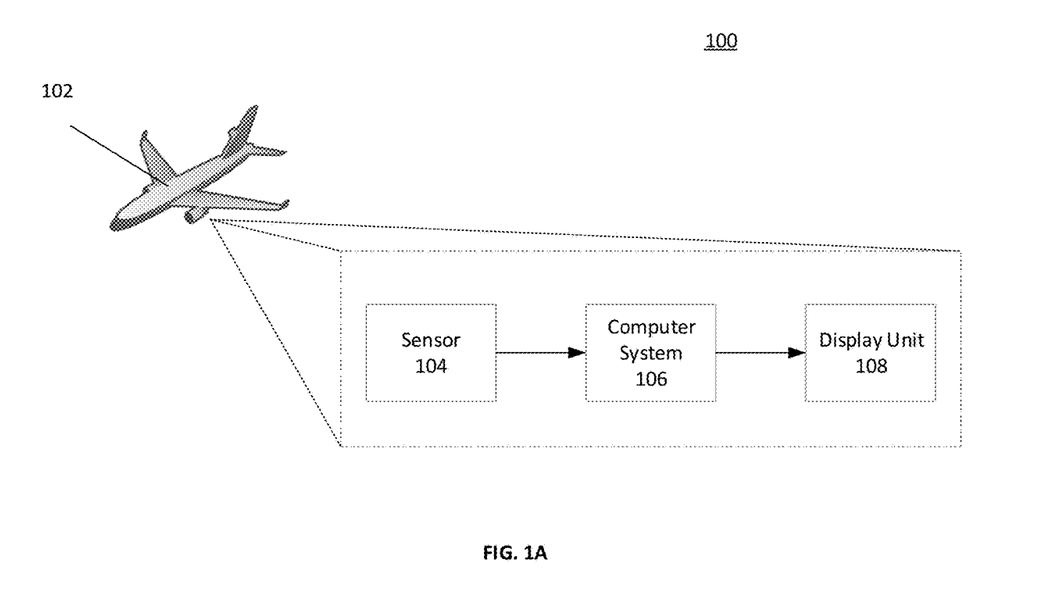
FIG. 1A shows a diagram of a system for operating an electronic checklist for an aircraft in accordance with one embodiment.

Turning now to FIG. 1A, a diagram 100 is shown of an in-flight aircraft 102 that contains various sensors 104 that are in communication with an onboard computer system or "flight management system (FMS)" 106 along with a visual display unit 108 that is accessed by the FMS 106 in accordance with one embodiment. The sensors 104 monitor} the status or various aviation subsystems or "line replaceable unit (LRU)". In alternative embodiments, the visual data unit 108 may be integrated as part of the FMS 106. The FMS 106, as is generally known, is a specialized computer that automates a variety of in-flight tasks such as in-flight management of the flight plan. Using various sensors such as global positioning system (GPS), the FMS 106 determines the aircraft's position and guides the aircraft along its flight plan using its navigation database. From the cockpit, the FMS 106 is normally controlled through a visual display unit such as a control display unit (CDU) which incorporates a small screen, a keyboard or a touchscreen. The FMS 106 displays the flight plan and other critical flight data to the aircrew during operation.

The FMS 106 may have a built-in electronic memory system that contains a navigation database. The navigation database contains elements used for constructing a flight plan. In some embodiments, the navigation database may be separate from the FMS 106 and located onboard the aircraft while in other embodiments the navigation database may be located on the ground and relevant data provided to the FMS 106 via a (non-illustrated) communications link with a (non-illustrated) ground station. The navigation database used by the FMS 106 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 106 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 106 to modify the plight flight plan before takeoff or even while in flight for variety of reasons. Such changes may be entered via the CDU. Once in flight, the principal task of the FMS 106 is to accurately monitor the aircraft's position. This may use a GPS, a VHF omnidirectional range (VOR) system, or other similar sensor in order to determine and validate the aircraft's exact position. The FMS 106 constantly cross checks among various sensors to determine the aircraft's position with accuracy.

Additionally, the FMS 106 may be used to perform advanced vertical navigation (VNAV) functions. The purpose of VNAV is to predict and optimize the vertical path of the aircraft. The FMS 106 provides guidance that includes control of the pitch axis and of the throttle of the aircraft. In order to accomplish these tasks, the FMS 106 has detailed flight and engine model data of the aircraft. Using this information, the FMS 106 may build a predicted vertical descent path for the aircraft. A correct and accurate implementation of VNAV has significant advantages in fuel savings and on-time efficiency.

In exemplary embodiments, an existing flight management computer (FMC) (or flight management system (FMS)) onboard an aircraft is utilized to communicate data between existing onboard aviation sub-systems or line-replaceable units (LRUs) and another modules coupled to the FMC, which supports or otherwise performs new flight management functionality that is not performed by the FMC. For example, a multifunction control and display unit (MCDU) may support or otherwise perform new flight management functionality based on data from onboard aviation subsystems or LRUs received via the FMC. In this regard, the FMC is configured to receive operational or status data from one or more aviation sub-systems or LRUs onboard the aircraft at corresponding avionics interfaces and convert one or more characteristics of the operational data to support communicating the operational data with the MCDU. For purposes of explanation, the subject matter may primarily be described herein in the context of converting operational data received from onboard aviation sub-systems or LRUs in a first format (e.g., an avionics bus format) into another format supported by the interface with the MCDU, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

Figure 1B:
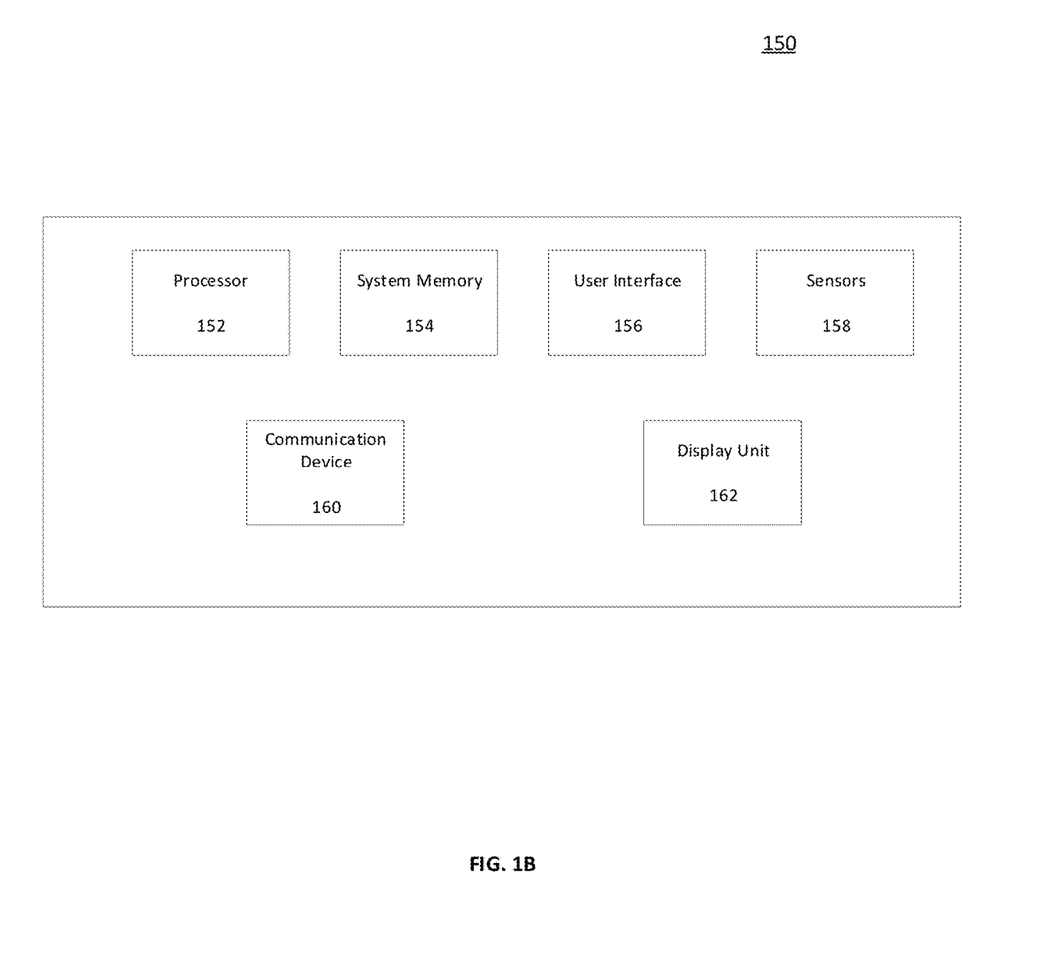
FIG. 1B shows a block diagram of a system for operating an electronic checklist for an aircraft in accordance with one embodiment.

FIG. 1B is a functional block diagram of a computing device 150, in accordance with the disclosed embodiments. It should be noted that the computing device 150 can be implemented with the computing device 104 depicted in FIG. 1A. In this regard, the computing device 150 shows certain elements and components of the computing device 104 in more detail.

The computing device 150 generally includes, without limitation: a processor 152; system memory 154; a user interface 156; a plurality of sensors 158; a communication device 160; and a display device or "display unit" 162. These elements and features of the computing device 150 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 1B. Moreover, it should be appreciated that embodiments of the computing device 150 will include other elements, modules, and features that cooperate to support the desired functionality. For simplicity, FIG. 1B only depicts certain elements that are described in more detail below.

The processor 152 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 152 may be realized as one or more microprocessors, controllers, microcontrollers, or state machines. Moreover, the processor 152 may be implemented as a combination of computing devices, e.g., a combination of digital signal processors and microprocessors, a plurality of microprocessors, one or more microprocessors in conjunction with a digital signal processor core, or any other such configuration.

The processor 152 is communicatively coupled to the system memory 154. The system memory 154 is configured to store any obtained or generated data associated with generating alerts to redirect user attention from the computing device 150 to a critical or high-priority flight situation. The system memory 154 may be realized using any number of devices, components, or modules, as appropriate to the embodiment. Moreover, the computing device 150 could include system memory 154 integrated therein and/or a system memory 154 operatively coupled thereto, as appropriate to the particular embodiment. In practice, the system memory 154 could be realized as RAM memory, flash memory, EPROM memory, EEPROM memory, registers, a hard disk, a removable disk, or any other form of storage medium known in the art. In certain embodiments, the system memory 154 includes a hard disk, which may also be used to support functions of the computing device 150. The system memory 154 can be coupled to the processor 152 such that the processor 152 can read information from, and write information to, the system memory 154. In the alternative, the system memory 154 may be integral to the processor 152. As an example, the processor 152 and the system memory 154 may reside in a suitably designed application-specific integrated circuit (ASIC).

The user interface 156 may include or cooperate with various features to allow a user to interact with the computing device 150. Accordingly, the user interface 156 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 150. For example, the user interface 156 could be manipulated by an operator to provide flight data parameters during the operation of electronic flight bag (EFB) applications, as described herein.

In certain embodiments, the user interface 156 may include or cooperate with various features to allow a user to interact with the computing device 156 via graphical elements rendered on a display element (e.g., the display device 162). Accordingly, the user interface 156 may initiate the creation, maintenance, and presentation of a graphical user interface (GUI). In certain embodiments, the display device or "display unit" 162 implements touch-sensitive technology for purposes of interacting with the GUI. Thus, a user can manipulate the GUI by moving a cursor symbol rendered on the display device 162, or by physically interacting with the display device 162 itself for recognition and interpretation, via the user interface 156.

The plurality of sensors 158 is configured to obtain data associated with active use of the computing device 150, and may include, without limitation: touchscreen sensors, accelerometers, gyroscopes, or the like. Some embodiments of the computing device 150 may include one particular type of sensor, and some embodiments may include a combination of different types of sensors. Generally, the plurality of sensors 158 provides data indicating whether the computing device 150 is currently being used. Touchscreen sensors may provide output affirming that the user is currently making physical contact with the touchscreen (e.g., a user interface 156 and/or display device 162 of the computing device 150), indicating active use of the computing device. Accelerometers and/or gyroscopes may provide output affirming that the computing device 150 is in motion, indicating active use of the computing device 150.

The communication device 160 is suitably configured to communicate data between the computing device 150 and one or more remote servers and one or more avionics systems onboard an aircraft. The communication device 160 may transmit and receive communications over a wireless local area network (WLAN), the Internet, a satellite uplink/downlink, a cellular network, a broadband network, a wide area network, or the like. As described in more detail below, data received by the communication device 160 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 150. Data provided by the communication device 160 may include, without limitation, requests for avionics systems data, alerts and associated detail for display via an aircraft onboard display, and the like.

The display device 162 is configured to display various icons, text, and/or graphical elements associated with alerts related to situations requiring user attention, wherein the situations are associated with a device or system that is separate and distinct from the computing device 150. In an exemplary embodiment, the display device 162 and the user interface 156 are communicatively coupled to the processor 152. The processor 152, the user interface 156, and the display device 162 are cooperatively configured to display, render, or otherwise convey one or more graphical representations or images associated with high-priority or critical flight situation alerts on the display device 162, as described in greater detail below. In an exemplary embodiment, the display device 162 is realized as an electronic display configured to graphically display critical flight situation alerts and associated detail, as described herein. In some embodiments, the computing device 150 is an integrated computer system onboard an aircraft, and the display device 162 is located within a cockpit of the aircraft and is thus implemented as an aircraft display. In other embodiments, the display device 162 is implemented as a display screen of a standalone, personal computing device (e.g., laptop computer, tablet computer). It will be appreciated that although the display device 162 may be implemented using a single display, certain embodiments may use additional displays (i.e., a plurality of displays) to accomplish the functionality of the display device 162 described herein.

Figure 2:
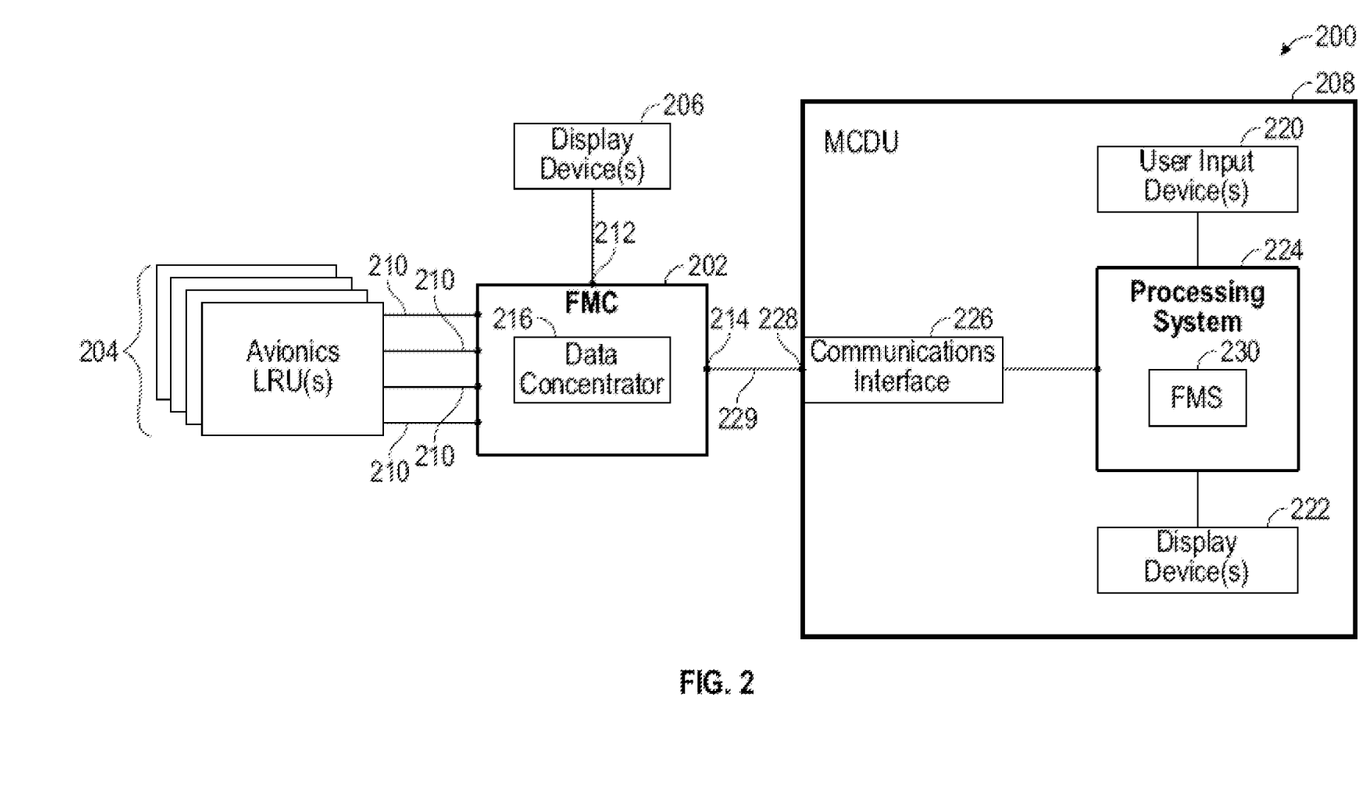
FIG. 2 shows a detailed block diagram of a system for operating an electronic checklist for an aircraft in accordance with one embodiment.

FIG. 2 depicts an exemplary embodiment of an aircraft system 200 suitable for operating an electronic checklist onboard an aircraft 102 shown previously in FIGS. 1A and 1B. The illustrated aircraft system 200 includes a flight management computing module 202 communicatively coupled to a plurality of onboard avionics LRUs 204, one or more display devices 206, and a multifunction computing module 208. It should be appreciated that FIG. 2 depicts a simplified representation of the aircraft system 200 for purposes of explanation, and FIG. 2 is not intended to limit the subject matter in any way.

The flight management computing module 202 generally represents the FMC, the FMS, or other hardware, circuitry, logic, firmware and/or other components installed onboard the aircraft and configured to perform various tasks, functions and/or operations pertaining to flight management, flight planning, flight guidance, flight envelope protection, four-dimensional trajectory generation or required time of arrival (RTA) management, and the like. Accordingly, for purposes of explanation, but without limiting the functionality performed by or supported at the flight management computing module 202, the flight management computing module 202 may alternatively be referred to herein as the FMC. The FMC 202 includes a plurality of interfaces 210 configured to support communications with the avionics LRUs 204 along with one or more display interfaces 212 configured to support coupling one or more display devices 206 to the FMC 202. In the illustrated embodiment, the FMC 202 also includes a communications interface 214 that supports coupling the multifunction computing module 208 to the FMC 202.

The FMC 202 generally includes a processing system designed to perform flight management functions, and potentially other functions pertaining to flight planning, flight guidance, flight envelope protection, and the like. Depending on the embodiment, the processing system could be realized as or otherwise include one or more processors, controllers, application specific integrated circuits, programmable logic devices, discrete gate or transistor logics, discrete hardware components, or any combination thereof. The processing system of the FMC 202 generally includes or otherwise accesses a data storage element (or memory), which may be realized as any sort of non-transitory short or long term storage media capable of storing programming instructions for execution by the processing system of the FMC 202. In exemplary embodiments, the data storage element stores or otherwise maintains code or other computer-executable programming instructions that, when read and executed by the processing system of the FMC 202, cause the FMC 202 to implement, generate, or otherwise support a data concentrator application 216 that performs certain tasks, operations, functions, and processes described herein.

The avionics LRUs 204 generally represent the electronic components or modules installed onboard the aircraft that support navigation, flight planning, and other aircraft control functions in a conventional manner and/or provide real-time data and/or information regarding the operational status of the aircraft to the FMC 202. For example, practical embodiments of the aircraft system 200 will likely include one or more of the following avionics LRUs 204 suitably configured to support operation of the aircraft: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, and/or another suitable avionics system.

In exemplary embodiments, the avionics interfaces 210 are realized as different ports, terminals, channels, connectors, or the like associated with the FMC 202 that are connected to different avionics LRUs 204 via different wiring, cabling, buses, or the like. In this regard, the interfaces 210 may be configured to support different communications protocols or different data formats corresponding to the respective type of avionics LRU 204 that is connected to a particular interface 210. For example, the FMC 202 may communicate navigation data from a navigation system via a navigation interface 210 coupled to a data bus supporting the ARINC 424 (or A424) standard, the ARINC 629 (or A629) standard, the ARINC 422 (or A422) standard, or the like. As another example, a datalink system or other communications LRU 204 may utilize an ARINC 619 (or A619) compatible avionics bus interface for communicating datalink communications or other communications data with the FMC 202.

The display device(s) 206 generally represent the electronic displays installed onboard the aircraft in the cockpit, and depending on the embodiment, could be realized as one or more monitors, screens, liquid crystal displays (LCDs), a light emitting diode (LED) displays, or any other suitable electronic display(s) capable of graphically displaying data and/or information provided by the FMC 202 via the display interface(s) 212. Similar to the avionics interfaces 210, the display interfaces 212 are realized as different ports, terminals, channels, connectors, or the like associated with the FMC 202 that are connected to different cockpit displays 206 via corresponding wiring, cabling, buses, or the like. In one or more embodiments, the display interfaces 212 are configured to support communications in accordance with the ARINC 661 (or A661) standard. In one embodiment, the FMC 202 communicates with a lateral map display device 206 using the ARINC 702 (or A702) standard.

In exemplary embodiments, the multifunction computing module 208 is realized as a multifunction control and display unit (MCDU) that includes one or more user interfaces, such as one or more input devices 220 and/or one or more display devices 222 (shown previously as 106 in FIG. 1), a processing system 224, and a communications module 226. The MCDU 208 generally includes at least one user input device 220 that is coupled to the processing system 224 and capable of receiving inputs from a user, such as, for example, a keyboard, a key pad, a mouse, a joystick, a directional pad, a touchscreen, a touch panel, a motion sensor, or any other suitable user input device or combinations thereof. The display device(s) 222 may be realized as any sort of monitor, screen, LCD, LED display, or other suitable electronic display capable of graphically displaying data and/or information under control of the processing system 224.

The processing system 224 generally represents the hardware, circuitry, logic, firmware and/or other components of the MCDU 208 configured to perform the various tasks, operations, functions and/or operations described herein. Depending on the embodiment, the processing system 224 may be implemented or realized with a general purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the processing system 224, or in any practical combination thereof. In this regard, the processing system 224 includes or accesses a data storage element (or memory), which may be realized using any sort of non-transitory short or long term storage media, and which is capable of storing code or other programming instructions for execution by the processing system 224. In exemplary embodiments described herein, the code or other computer-executable programming instructions, when read and executed by the processing system 224, cause the processing system 224 to implement with an FMS 230 (shown previously as 104 in FIG. 1) additional tasks, operations, functions, and processes described herein.

The communications module 226 generally represents the hardware, module, circuitry, software, firmware and/or combination thereof that is coupled between the processing system 224 and a communications interface 228 of the MCDU 208 and configured to support communications between the MCDU 208 and the FMC 202 via an electrical connection 229 between the MCDU communications interface 228 and the FMC communications interface 214. For example, in one embodiment, the communications module 226 is realized as an Ethernet card or adapter configured to support communications between the FMC 202 and the MCDU 208 via an Ethernet cable 229 provided between Ethernet ports 214, 228. In other embodiments, the communications module 226 is configured to support communications between the FMC 202 and the MCDU 208 in accordance with the ARINC 429 (A429) standard via an A429 data bus 229 provided between A429 ports 214, 228 of the respective modules 202, 208. In yet other embodiments, the communications module 226 is configured to support communications between the FMC 202 and the MCDU 208 in accordance with the ARINC 422 (A422) standard via an A422 data bus 229 provided between A422 ports 214, 228 of the respective modules 202, 208. In yet other embodiments, the communications module 226 is configured to support communications between the FMC 202 and the MCDU 208 in accordance with the ARINC 739 (A739) standard via an A739 data bus 229 provided between A739 ports 214, 228 of the respective modules 202, 208.

In various embodiments, the FMC 202 and MCDU 208 communicate using a different communications protocol or standard than one or more of the avionics LRUs 204 and/or the display devices 206. In such embodiments, to support communications of data between the MCDU 208 and those LRUs 204 and/or display devices 206, the data concentrator application 216 at the FMC 202 converts data from one format to another before retransmitting or relaying that data to its destination. For example, the data concentrator application 216 may convert data received from an avionics LRU 204 to the A429 or Ethernet format before providing the data to the MCDU 208, and vice versa. Additionally, in exemplary embodiments, the FMC 202 validates the data received from an avionics LRU 204 before transmitting the data to the MCDU 208. For example, the FMC 202 may perform debouncing, filtering, and range checking, and/or the like prior to converting and retransmitting data from an avionics LRU 204.

It should be noted that although the subject matter may be described herein in the context of the multifunction computing module 208 being realized as an MCDU, in alternative embodiments, the multifunction computing module 208 could be realized as an electronic flight bag (EFB) or other mobile or portable electronic device. In such embodiments, an EFB capable of supporting an FMS 230 application may be connected to an onboard FMC 202 using an Ethernet cable 229 to support flight management functionality from the EFB in an equivalent manner as described herein in the context of the MCDU.

In one or more embodiments, the MCDU 208 stores or otherwise maintains programming instructions, code, or other data for programming the FMC 202 and transmits or otherwise provides the programming instructions to the FMC 202 to update or otherwise modify the FMC 202 to implement the data concentrator application 216. For example, in some embodiments, upon establishment of the connection 229 between modules 202, 208, the MCDU 208 may automatically interact with the FMC 202 and transmit or otherwise provide the programming instructions to the FMC 202, which, in turn, executes the instructions to implement the data concentrator application 216. In some embodiments, the data concentrator application 216 may be implemented in lieu of flight management functionality by the MCDU 208 reprogramming the FMC 202. In other embodiments, the FMC 202 may support the data concentrator application 216 in parallel with flight management functions. In this regard, the FMC 202 may perform flight management functions, while the FMS 230 application on the MCDU 208 supplements the flight management functions to provide upgraded flight management functionality within the aircraft system 200.

In present embodiments, operation of electronic checklist provides auto-sensing functionality that implements an automated checklist step state verification. An onboard computer system is used to monitor various sensors on board the aircraft. The sensors in turn monitor the status of various aviation subsystems of the aircraft. The status of each of the subsystems is then graphically displayed to the pilot/aircrew of the aircraft with a graphical display system. The checklists actions may rely on more than one or more condition and can queue in sequence in some embodiments. In some cases, this may result in longer automated sequences of checklist steps.

The functionality of an automated checklist may have two variants: an auto checking system; and a cross checking system. The "auto checking" system begins operation as a checklist step becomes active. The system verifies the configuration/system state required by the step and performs the step confirmation action automatically if the condition is met. In some embodiments, the pilot/aircrew may be able to override any of the automated actions. A "cross checking" system only monitors the pilots step confirmation actions and provides notification in cases where the confirmation is not backed up with the current state of the sub-system as detected by the sensor.

A key to the versatile checklist step automation lays in a highly configurable software architecture utilizing a concept of sensors and software components for evaluating the aviation subsystem conditions as well as the operational condition of the sensors themselves. The sensor has a dedicated software block taking the aircraft data from the aircraft subsystem, performing simple logical operation and outputting a Boolean result for the application. The application, based on the results of one or more sensors, performs the auto checking or cross checking actions and provides the graphical information to the pilot on the step conditions state. The current sensor configuration of input data and expected operation is typically hard coded, but a configurable solution is possible, where the sensor can be driven by a small configuration record, containing the definition of input value(s), optionally constant value(s) for comparison purpose, and an operation to be performed.

The sensor input has the several format options: a single sensor input value that is compared with a constant predetermined value; a first sensor input value that is compared with a second sensor input value; and a single sensor input value that is compared with two predetermined constant values that form a value range. A single senior sensor input value that is compared with the constant supports numeric value comparisons (e.g., lesser than, equal, not equal, greater than, etc.). A first sensor input value compared to a second sensor input value supports a non-numeric value comparison (e.g., equal, not equal). Finally, a single input sensor value that is compared to two predetermined constant values supports an interval inclusion/exclusion (e.g., inside interval range, outside interval range). In all cases, the sensor output has two value options being either true or false based on the results of the performed comparisons. Additional operations can be implemented if needed and more complex step automation can be achieved by a combination of multiple sensors.

An advantage of some embodiments is the ability for an original equipment manufacturer (OEM) to configure sensor appearances and display them inside the display of checklist steps. The sensor display provides the pilot with compact and intuitive guidance as to exactly why a closed-loop checklist step is refusing to complete and indicates to the pilot exactly where he needs to direct his attention in order to resolve the situation. The sensor display that is internal to the checklist steps is created by providing a grammar to the checklist author that allows that author to create a small display internal to the checklist step that guides the pilot to the sensor, rather than having the pilot attempt to guess from the context of the step where he might need to go.

The graphical representation of the sensor output is an intuitive representation of the sensor state that also corresponds with the overall checklist step condition state. Different cockpit and OEM preferences require high degree of the configurability of the sensor graphical representation. Such configurability is implemented as the configurable for both sensor states (on and off) that include: text; color; outline color; background color; font size; etc.

Figure 3:
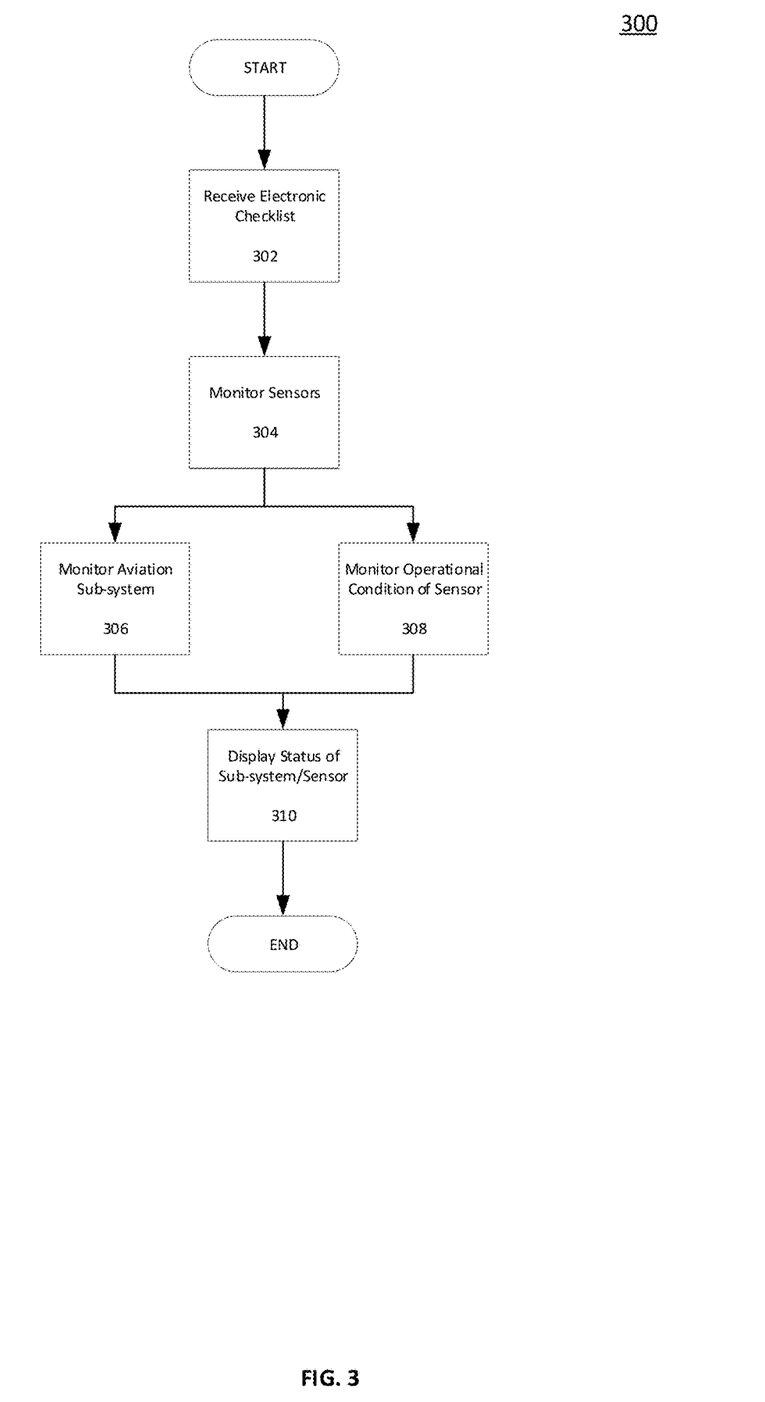
FIG. 3 shows a method for operating an electronic checklist for an aircraft in accordance with one embodiment.

Turning now to FIG. 3, a flowchart 300 showing a method for operating an electronic checklist for an aircraft is shown in accordance with one embodiment. First, an electronic checklist is received 302 that includes the items for an aviation subsystem that is part of the aircraft. Any sensors that indicate the status of the aviation subsystem are monitored 304. An onboard computer system monitors the electronic checklist and determines: the status of the aviation subsystem on the electronic checklist 306; and the operational condition of the sensor that monitors the status of that aviation subsystem 308. Both the status of the subsystem and the condition of the sensor are then shown on a graphical display unit 310. If a checklist step is incomplete, the graphical display unit shows the state of the sensors that used to monitor and are indicative of the status of the specific incomplete checklist step. For example, an expression on a display is provided to the pilot identifying a step on a checklist that is not completed. The checklist algorithm provides a listing of the sensors and an indication of the current status of which sensor is involved in the incomplete checklist step. This assists the pilot in identifying the problem and completing the checklist.

In addition to monitoring the status of the aviation subsystem as indicated by a sensor, some embodiments will also monitor the operational condition of the sensor itself. A sensor that gives a false status indication may generate uncertainty and lack of confidence in the automated checklist system on the part of the aircrew. Consequently, the onboard computer system may be configured to monitor the operational status of the sensor to ensure that it is providing the correct feedback to the pilot. For example, the sensor status may be encoded into the checklist indicate if the sensor is on/off, broken or overridden by the crew. The sensor status may be indicated by various icons, colors or alerts that may be configured to the individual preference of the aircrew or OEM.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for operating an electronic checklist for an aircraft, comprising:
an aviation sub-system that is part of the aircraft, where a status of the aviation subsystem is indicated by an item on the electronic checklist;
a sensor that monitors the status of the aviation sub-system with reference to the item on the electronic checklist;
an onboard computer system that monitors completion of the item on the electronic checklist, where the onboard computer system determines,
the status of the aviation sub-system as required by the item on the electronic checklist, and
an operational condition of the sensor that monitors the status of the aviation sub-system, the operational condition of the sensor being one of an off condition, a broken condition, and an override condition; and
a graphical display unit that shows completion of each item on the electronic checklist, where upon a determination that the operational condition of the sensor is one of the off condition, the broken condition, and the override condition, the graphical display unit shows the status of the item on the electronic checklist as incomplete.

2. The system of claim 1, where the electronic checklist supports an auto checking system that verifies the status of the aviation sub-system and performs a confirmation action automatically if the status of the aviation sub-system is satisfactory.

3. The system of claim 2, where a pilot of the aircraft may manually override the automatic confirmation action.

4. The system of claim 1, where the electronic checklist supports a cross checking system that monitors a verification of the status of the aviation sub-system conducted by a pilot of the aircraft and provides a notification when the verification by the pilot conflicts with the status of the aviation sub-system according to the sensor.

5. The system of claim 1, where the onboard computer system determines the status of the aviation sub-system by receiving a single input value from the sensor that is compared with a constant pre-determined value.

6. The system of claim 5, where the onboard computer system uses the sensor input value and the constant pre-determined value to make a numerical value comparison.

7. The system of claim 1, where the onboard computer system determines the status of the aviation sub-system by receiving a first input value from the sensor that is compared with a second input value from a second sensor.

8. The system of claim 7, where the onboard computer system uses the first input value and the second input value to make an equivalency comparison.

9. The system of claim 1, where the onboard computer system determines the status of the aviation sub-system by receiving a single input value from the sensor that is compared with two constant pre-determined values.

10. The system of claim 9, where the onboard computer system uses the sensor input value and the two constant pre-determined values to make a range value comparison, where the range is defined by the two constant pre-determined values.

11. A method for operating an electronic checklist for an aircraft, comprising:
receiving an electronic checklist that indicates a status of an aviation subsystem as an item on the electronic checklist;
monitoring a sensor that monitors the status of the aviation sub-system with reference to the item on the electronic checklist;
determining with an onboard computer system that monitors the completion of the item on the electronic checklist,
the status of the aviation sub-system as required by the item on the electronic checklist, and
an operational condition of the sensor that monitors the status of aviation sub-system, the operational condition of the sensor being one of an off condition, a broken condition, and an override condition; and
showing a status of completion of each item on the electronic checklist on a graphical display unit, where upon a determination that the operational condition of the sensor is one of the off condition, the broken condition, and the override condition, the graphical display unit shows the status of the item on the electronic checklist as incomplete.

12. The method of claim 11, where the electronic checklist supports an auto checking system that verifies the status of the aviation sub-system and performs a confirmation action automatically if the status of the aviation sub-system is satisfactory.

13. The method of claim 12, where a pilot of the aircraft may manually override the automatic confirmation action.

14. The method of claim 11, where the electronic checklist supports a cross checking system that monitors a verification of the status of the aviation sub-system conducted by a pilot of the aircraft and provides a notification when the verification by the pilot conflicts with the status of the aviation sub-system according to the sensor.

15. The method of claim 11, where the onboard computer system determines the status of the aviation sub-system by receiving a single input value from the sensor that is compared with a constant pre-determined value.

16. The method of claim 15, where the onboard computer system uses the sensor input value and the constant pre-determined value to make a numerical value comparison.

17. The method of claim 11, where the onboard computer system determines the status of the aviation sub-system by receiving a first input value from the sensor that is compared with a second input value from a second sensor.

18. The method of claim 17, where the onboard computer system uses the first input value and the second input value to make an equivalency comparison.

19. The method of claim 11, where the onboard computer system determines the status of the aviation sub-system by receiving a single input value from the sensor that is compared with two constant pre-determined values.

20. The method of claim 19, where the onboard computer system uses the sensor input value and the two constant pre-determined values to make a range value comparison, where the range is defined by the two constant pre-determined values.

* * * * *